(12) United States Patent
Grenzhäuser et al.

(10) Patent No.: US 12,366,291 B2
(45) Date of Patent: Jul. 22, 2025

(54) VALVE MODULE WITH ACTIVE VALVE OILING

(71) Applicant: Schaeffler Technologies AG & Co. KG, Herzogenaurach (DE)

(72) Inventors: Matthias Grenzhäuser, Bühl (DE); Christopher Schneider, Bad Herrenalb (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 47 days.

(21) Appl. No.: 18/567,871

(22) PCT Filed: Apr. 25, 2022

(86) PCT No.: PCT/DE2022/100308
§ 371 (c)(1),
(2) Date: Dec. 7, 2023

(87) PCT Pub. No.: WO2022/262889
PCT Pub. Date: Dec. 22, 2022

(65) Prior Publication Data
US 2024/0280171 A1  Aug. 22, 2024

(30) Foreign Application Priority Data
Jun. 14, 2021  (DE) .................... 10 2021 115 301.8

(51) Int. Cl.
*F16H 61/00* (2006.01)
*F15B 21/047* (2019.01)

(52) U.S. Cl.
CPC ........ *F16H 61/0009* (2013.01); *F15B 21/047* (2013.01); *F16H 2061/0037* (2013.01)

(58) Field of Classification Search
CPC ......... F16H 2061/0037; F16H 61/0009; F16H 61/0276; F16H 2061/0279; F15B 21/047
See application file for complete search history.

(56) References Cited

U.S. PATENT DOCUMENTS

| 5,435,227 | A  | * | 7/1995 | Frey ...................... F01D 17/26 91/1 |
| 10,724,623 | B2 | * | 7/2020 | Ono .................... F16H 57/0446 |
| 11,635,075 | B1 | * | 4/2023 | Giarratana ............. F01C 21/02 417/171 |
| 2017/0363203 | A1 | | 12/2017 | Roskowski et al. |

FOREIGN PATENT DOCUMENTS

| DE | 102010056286 B3 | 5/2012 |
| DE | 102018219113 A1 | 5/2020 |

* cited by examiner

*Primary Examiner* — Jake Cook
(74) *Attorney, Agent, or Firm* — Matthew V. Evans

(57) ABSTRACT

The valve module can be installed regardless of an oil level, for example of an oil level of an oil sump of a motor vehicle. By means of a buffer volume having an overflow it is always guaranteed that a leakage flow conveyed past a valve piston includes no air but consists solely of hydraulic medium, since the overflow guarantees a level of hydraulic medium which lies above an upper face of the valve piston in a preferred installation position. As a result, foaming of the hydraulic medium can be prevented. The valve module can also be installed above the oil sump, for example in an upper region of a gearbox of the motor vehicle. In addition, the oil from the overflow can be used for cooling/lubrication of further drive train components.

20 Claims, 2 Drawing Sheets

VALVE MODULE WITH ACTIVE VALVE OILING

CROSS-REFERENCE TO RELATED APPLICATIONS

This application is the U.S. National Phase of PCT Application No. PCT/DE2022/100308 filed on Apr. 25, 2022, which claims priority to DE 10 2021 115 301.8 filed on Jun. 14, 2021, the entire disclosures of which are incorporated by reference herein.

TECHNICAL FIELD

The present disclosure relates to a valve module for a hydraulic control system, in particular for use in the drive train of motor vehicles.

BACKGROUND

Valve modules for hydraulic control systems that are used, for example, for the hydraulic actuation of clutches in motor vehicles are known. A valve module is assumed to be known which comprises a valve installed below the normal oil level in an oil sump of the motor vehicle. This prevents leakage flows past the valve piston from introducing air into the hydraulic medium. However, this considerably restricts the installation position of the valve module. This is a considerable disadvantage, in particular in modern motor vehicles where installation space is limited.

SUMMARY

Proceeding therefrom, the object of the present disclosure is to at least partially overcome the problems known from the prior art.

This object is achieved with the features described herein. The features described individually herein can be combined with one another in a technologically meaningful manner and can define further embodiments of the disclosure.

The valve module according to the disclosure for a hydraulic control system provided for installation in a predetermined installation position comprises a valve with a valve piston which can be displaced in an actuating direction in a housing which has a plurality of openings which can be opened and closed by displacement of the valve piston, wherein at least one opening constitutes a tank connection via which the valve can be fluidly connected to a reservoir, in particular an oil sump, for a hydraulic medium. The valve module is characterized in that the at least one tank connection is fluidly connected to a buffer volume which has an overflow which, when installed in the installation position, is arranged above an upper face of the valve piston.

By constantly filling the buffer volume with hydraulic medium up to the overflow, it can thus be guaranteed that no air can be conveyed past the valve piston, which could lead to foaming of the hydraulic medium. This allows the valve module to be arranged irrespective of the oil circuit of the motor vehicle and, in particular, outside of the oil sump.

The openings can comprise any number of consumer connections in addition to the at least one tank connection. Furthermore, one opening can be designed as a pump connection via which a pump can be fluidly connected, by means of which hydraulic medium can be conveyed. The pump can be designed as a reversing pump that can be operated either in a pressing or aspirating capacity. This allows the valve module to be used in systems in which both a hydraulic actuation, for example of at least one clutch and/or parking lock, is performed and cooling is provided by the hydraulic medium, for example of one or more electric motors.

The buffer volume can be fluidly connected to a hydraulic circuit via a flow limiter, via which the buffer volume can be filled. By means of the flow limiter, it can be achieved that a part, for example, a small part, in the amount of the expected maximum valve leakage, of the volume flow of hydraulic medium in the hydraulic circuit can be conveyed into the buffer volume. This means that the buffer volume is always supplied with hydraulic medium. In this regard, the level in the buffer volume is limited by the overflow. If too much hydraulic medium is conveyed into the buffer volume, it flows out again via the overflow, which can be fluidly connected to the reservoir for hydraulic medium. The term "hydraulic circuit", in this regard, refers to the circuit comprising the pump, the reservoir for hydraulic medium and the at least one consumer. This can be an actuating device for a clutch and/or for a parking lock, or it can be a component that needs to be cooled and/or lubricated, such as an electric motor.

At least one orifice can be used as the flow limiter. An orifice can be formed in a simple manner, for example as a hole in a wall or machined, and can be punched in a sealing plate separating the two hydraulic plates from one another, constituting an efficient flow limiter. An exemplary embodiment includes several orifices to be flowed through sequentially, preferably two orifices. By forming several orifices of different sizes, a precise adjustment of the volume flow into the buffer volume can be achieved.

At least one leakage line is also formed, which is fluidly connected to the buffer volume in order to guide leakage flows from other hydraulic components into the buffer volume. This increases the volume flow of hydraulic medium into the buffer volume and increases the operational reliability of the valve module. The pump, such as the reversing pump, is particularly advantageous as a hydraulic component. The leakage line can be formed in combination with the flow limiter in order to increase operational reliability by maintaining as constant a level as possible in the buffer volume. If the component, for example the pump, in particular the reversing pump, has a high leakage flow, the additional formation of the flow limiter and thus the connection to the hydraulic circuit can be omitted.

The overflow of the buffer volume can be fluidly connected to a lubrication line via which hydraulic medium can be discharged as lubricant or coolant. In particular, a valve can be formed via which the lubrication line can be opened and closed in order to allow lubrication only when sufficient hydraulic medium flows into the buffer volume. For example, bearings can be lubricated or cooled or gears can be lubricated via the lubrication line.

Furthermore, a drive train for a motor vehicle is proposed, comprising a valve module as presented herein.

The drive train comprises an internal combustion engine and/or at least one electric motor for providing torque. In particular, it is a hybrid drive train with an internal combustion engine and at least one electric motor.

The details and advantages disclosed for the valve module can be transferred and applied to the drive train and vice versa.

Further proposed is a motor vehicle comprising at least one valve module as presented herein and/or a drive train as presented herein.

As a precaution, it should be noted that the numerical designations used here ("first", "second", etc.) serve primarily (only) to distinguish between several similar objects, sizes, or processes, and in particular no necessary dependency and/or sequence of these objects, sizes, or processes to each other is indicated. If a dependency and/or sequence is necessary, this is explicitly stated here or results in a manner obvious to the person skilled in the art when studying the specifically described configuration.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size relationships shown are only schematic in nature. Identical reference symbols indicate the same objects, so that, where applicable, explanations from other figures can also be used. In the figures.

DETAILED DESCRIPTION

Figure 1:
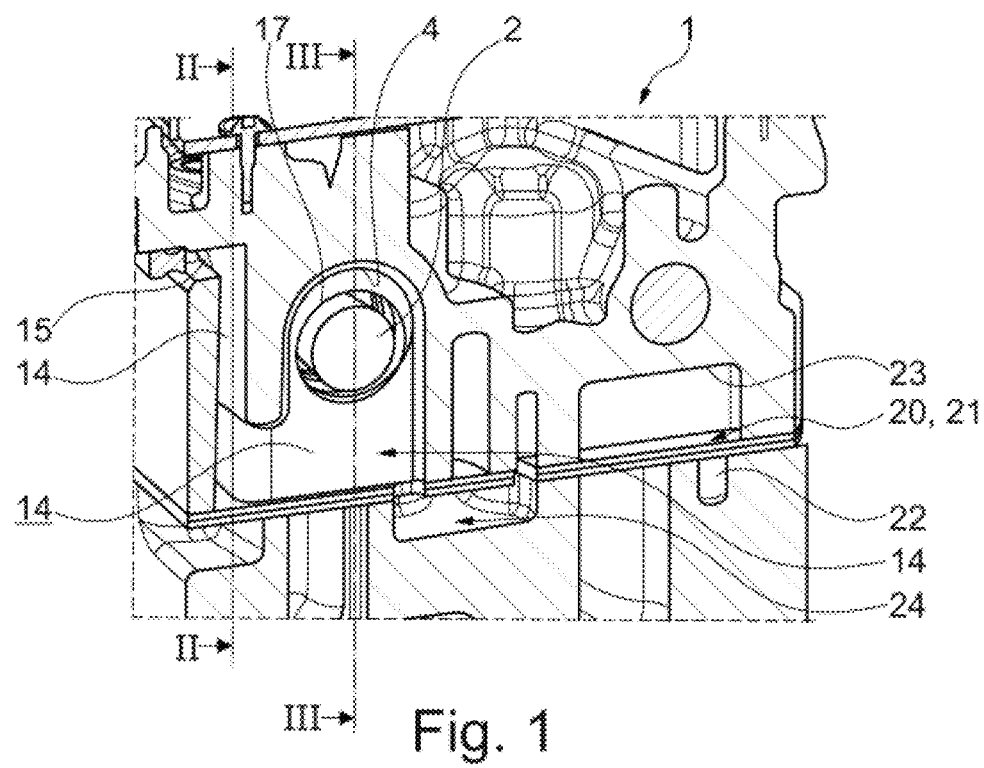
FIGS. 1-3 show three sectional views of an example of a valve module.
Figure 2:
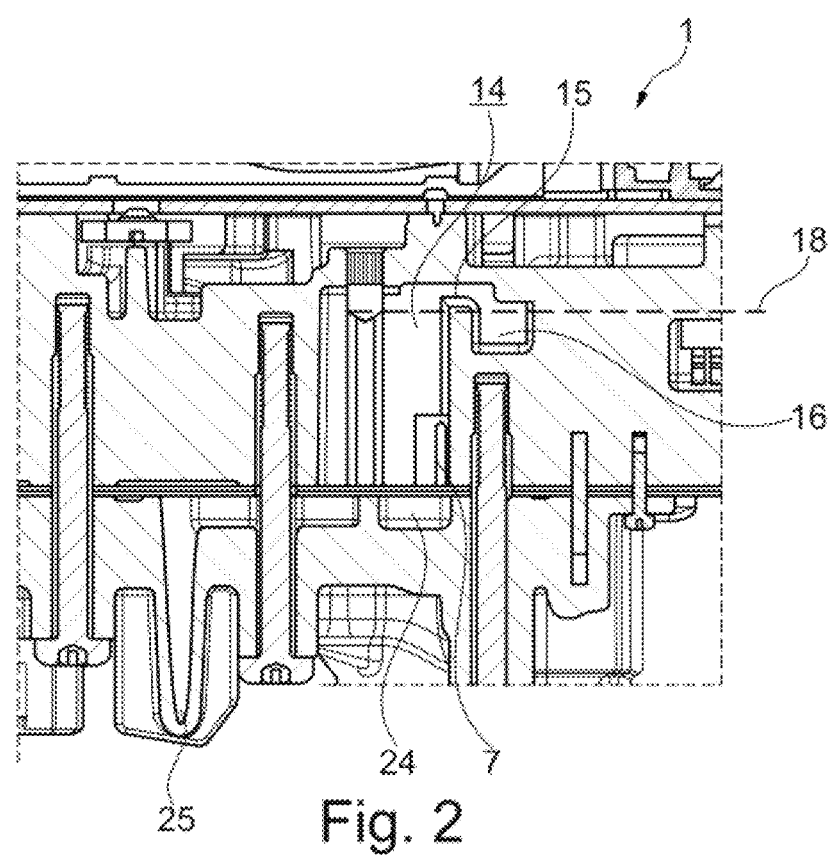
Figure 3:
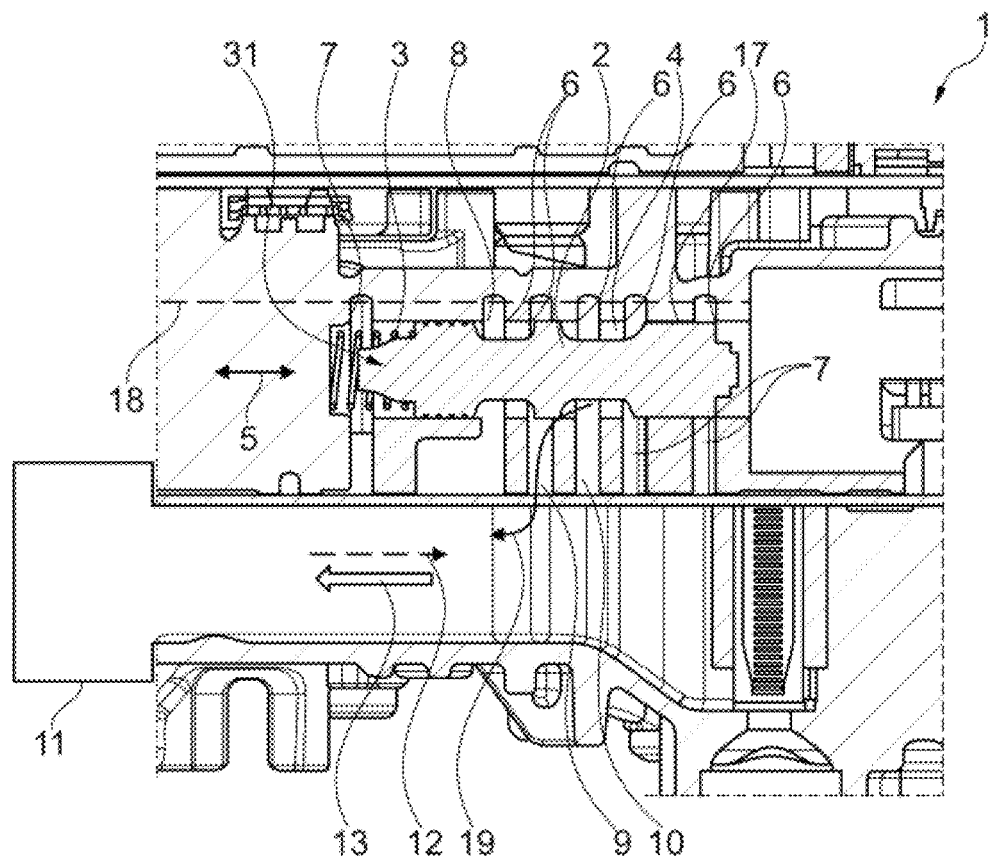

FIG. 1 shows a first section through a valve module 1, FIGS. 2 and 3 show two further sections, the position of which is indicated in FIG. 1. FIGS. 1 to 3 are described together below. The valve module 1 can be used in a hydraulic control system, in particular in a drive train of a motor vehicle, to supply various consumers, for example an actuating device for a clutch or an actuating device for a parking lock, with hydraulic medium, which is conveyed by a pump. At the same time, the hydraulic medium is also regularly used for cooling, for example to cool electric motors in a hybrid drive train. The valve module 1 therefore has a valve 31 with a valve piston 2 which can be displaced against a compression spring 3 in a housing 4 in an actuating direction 5. This allows openings 6 in the housing 4 to be opened and closed. In this context, the openings 6 comprise a plurality of tank connections 7 for fluid connection to a tank for hydraulic medium, a clutch connection 8 for fluid connection to an actuator system for actuating a clutch, in particular a friction clutch, in particular comprising a corresponding slave cylinder, a pump connection 9 for fluid connection to a pump, in particular a reversing pump 11 (shown schematically in FIG. 3), for conveying or aspirating the hydraulic medium, and a parking lock connection 10 for fluid connection to an actuator system for actuating a parking lock, in particular comprising a corresponding slave cylinder.

The valve module 1 is thus used in particular in a drive train, in particular in a hybrid drive train with an internal combustion engine and at least one electric motor, of a motor vehicle, in which a clutch and a parking lock are hydraulically actuated via the valve module 1 by applying hydraulic medium to the clutch connection 8 by means of the reversing pump 11, which originates from a reservoir for hydraulic medium fluidly connected to the tank connections 7. For this purpose, the reversing pump 11 is operated such that the hydraulic medium is conveyed in a first conveying direction 12. This is shown in FIG. 3, wherein it should be noted that the valve position as shown in FIG. 3 corresponds to an operation of the reversing pump 11 in which the hydraulic medium is conveyed in a second conveying direction 13, which is opposite to the first conveying direction 12. For clarification, the first conveying direction 12 is shown as a dashed line. With respect to the valve module 1, when the hydraulic medium is conveyed in the first conveying direction 12, it is pressed through the open openings 7 in the form of leakage, and when the hydraulic medium is conveyed in the second conveying direction 13, it is aspirated out of the open openings 7 of the valve module 1. The hydraulic medium is conveyed in the second conveying direction 13 in particular when the hydraulic medium is used for cooling of, for example, at least one electric motor.

The tank connections 7 are fluidly connected to a buffer volume 14, which comprises an overflow 15. The overflow 15 is, in this regard, fluidly connected to a connection 16 to the reservoir, in particular a tank and/or an oil sump, for hydraulic medium (not shown). The valve module 1 is installed in a preferred installation position (cf. the figures and in particular FIG. 3), in which the overflow 15 is located above an upper face 17 of the valve piston 2. When the buffer volume 14 is fully filled, this causes a level 18, i.e. a surface of the hydraulic medium, in the buffer volume 14 which is above the upper face 17 of the valve piston 2 (cf. FIG. 3). The upper face 17 of the valve piston 2 is defined as the highest surface of the valve piston 2 when the valve module 1 is installed in the preferred installation position.

If the valve module 1 and the reversing pump 11 are operated as shown in FIG. 3 in such a way that hydraulic medium is conveyed in the second conveying direction 13, i.e. in an aspirating manner, the level 18 results in a small leakage flow 19 of hydraulic medium being conveyed from the buffer volume 14 to the pump due to the system-related play present between the valve piston 2 and the housing 4. If the buffer volume 14 were not formed as shown, the leakage flow 19 could comprise air, particularly if the valve module 1 is not formed in an oil sump of the motor vehicle. The formation of the buffer volume 14 therefore makes it possible to arrange the valve module 1 outside of the oil sump and thus also to use free spaces surrounded by ambient air, for example in the upper region of a transmission housing. Thus, the valve module 1 described herein can be arranged in a much more flexible manner than the valve modules assumed to be known.

In order to guarantee that the buffer volume 14 is permanently filled with hydraulic medium up to the overflow 15, a hydraulic medium circuit 22 is fluidly connected via a flow limiter 20 to a supply line 23 which opens into the buffer volume 14 (cf. FIG. 1). An orifice 21 is formed here as the flow limiter 20. The flow limiter 20 causes a small part of the volume flow of hydraulic medium flowing through the hydraulic medium circuit 22 (which in turn is fluidly connected to a cooling oil connection) to be conveyed through the flow limiter 20 into the buffer volume 14 via the supply line 23. If this is already filled up to the overflow 15, hydraulic medium 15 runs back from the overflow 15 into the reservoir for hydraulic medium (not shown) and at the same time into the lubrication line 25. In this manner, the buffer volume 14 is always sufficiently filled with hydraulic medium in order to prevent air from entering into the hydraulic medium, which would lead to foaming of the hydraulic medium. If hydraulic medium is conveyed through at least one of the tank connections 7 into the reservoir for hydraulic medium (not shown), this also causes flow through the buffer volume 14 and the overflow 15 and results in maintenance of the level 18.

Furthermore, the valve module 1 comprises a leakage line 24, into which leakage flows from other components, for example the reversing pump 14, are directed to and which in turn is fluidly connected to the buffer volume 14 (cf. FIGS. 1 and 2). The buffer volume 14 is further fluidly connected to a lubrication line 25, via which further components such as a bearing or a gear wheel in the transmission can be supplied with hydraulic medium as a lubricant and/or coolant.

Figure 4:
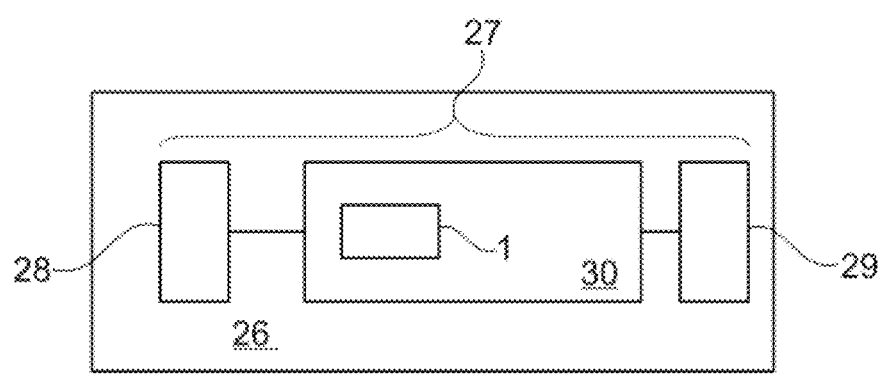
FIG. 4 shows a motor vehicle in a highly schematic manner.

FIG. 4 shows a motor vehicle 26 with a drive train 27 in a highly schematic manner. In this example, the drive train 27 is a hybrid drive train and comprises an internal combustion engine 28 and an electric motor 29 as torque sources. The internal combustion engine 28 and the electric motor 29 are connected to a rest of the drive train 30 which, in addition to a valve module 1 as described, comprises further components such as one or more transmissions and at least one driven wheel.

The valve module 1 can be installed independently of an oil level, for example of an oil sump of a motor vehicle 26. By means of a buffer volume 14 having an overflow 15 it is always guaranteed that a leakage flow 19 conveyed past a valve piston 2 includes no air but consists solely of hydraulic medium, since the overflow 15 guarantees a level 18 of hydraulic medium which lies above an upper face 17 of the valve piston 2 in the preferred installation position as shown in FIGS. 1 to 3. As a result, foaming of the hydraulic medium can be prevented. As a result, the valve module 1 can also be installed above the oil sump, for example in an upper region of a transmission of the motor vehicle 26. In addition, the oil from the overflow can be used for cooling/lubrication of further drive train components.

LIST OF REFERENCE SYMBOLS

1 Valve module
2 Valve piston
3 Compression spring
4 Housing
5 Actuating direction
6 Opening
7 Tank connection
8 Clutch connection
9 Pump connection
10 Parking lock connection
11 Reversing pump
12 First conveying direction
13 Second conveying direction
14 Buffer volume
15 Overflow
16 Connection to the reservoir
17 Upper face
18 Level
19 Leakage flow
20 Flow limiter
21 Orifice
22 Hydraulic medium circuit
23 Supply line
24 Leakage line
25 Lubrication line
26 Motor vehicle
27 Drive train
28 Internal combustion engine
29 Electric motor
30 Rest of the drive train

The invention claimed is:

1. A valve module configured for installation in a predetermined installation position within a hydraulic control system, the valve module comprising:
    a valve including a valve piston configured to be displaced in an actuating direction within a housing, the housing having a plurality of openings configured to be opened and closed via displacement of the valve piston, and
    a first opening of the plurality of openings is configured as a tank connection, and the valve is connected to a reservoir for a hydraulic medium via the tank connection, and
    the tank connection is fluidly connected to a buffer volume having an overflow arranged above an upper face of the valve piston when the valve module is installed in the predetermined installation position.

2. The valve module according to claim 1, wherein the buffer volume is fluidly connected to a hydraulic circuit via a flow limiter, and the buffer volume is configured to be filled via the flow limiter.

3. The valve module according to claim 2, wherein at least one orifice is configured as a flow limiter.

4. The valve module according to claim 1, further comprising at least one leakage line fluidly connected to the buffer volume, the at least one leakage line configured to guide leakage flows from other hydraulic components into the buffer volume.

5. The valve module according to claim 1, wherein the overflow of the buffer volume is fluidly connected to a lubrication line, and hydraulic medium can be discharged as lubricant or coolant via the lubrication line.

6. A drive train for a motor vehicle, comprising the valve module according to claim 1.

7. The drive train according to claim 6, further comprising at least one electric motor configured for providing torque.

8. The drive train according to claim 7, further comprising an internal combustion engine configured for providing torque.

9. A motor vehicle comprising:
    at least one valve module according to claim 1 and a drive train comprising an electric motor configured for providing torque.

10. The motor vehicle of claim 9, wherein the drive train further comprises an internal combustion configured for providing torque.

11. The valve module according to claim 1, wherein the valve piston is configured to be displaced against a compression spring arranged at a first longitudinal end of the valve piston.

12. The valve module according to claim 11, wherein the at least one opening extends away from the valve piston in a direction orthogonal to the actuating direction.

13. The valve module according to claim 11, wherein the tank connection is arranged at a second longitudinal end of the valve piston.

14. The valve module according to claim 13, wherein a second opening of the plurality of openings is a pump connection, and the pump connection is arranged between the compression spring and the tank connection in a longitudinal direction of the valve piston.

15. The valve module according to claim 14, wherein a third opening of the plurality of openings is a parking lock connection, and the parking lock connection is arranged between the compression spring and the tank connection in a longitudinal direction of the valve piston.

16. The valve module according to claim 3, further comprising at least one leakage line fluidly connected to the buffer volume, the at least one leakage line configured to guide leakage flows from other hydraulic components into the buffer volume.

17. The valve module according to claim 16, wherein the overflow of the buffer volume is fluidly connected to a lubrication line, and hydraulic medium can be discharged as lubricant or coolant via the lubrication line.

18. The valve module according to claim 16, wherein the valve piston is configured to be displaced against a compression spring arranged at a first longitudinal end of the valve piston.

19. The valve module according to claim 18, wherein the tank connection is arranged at a second longitudinal end of the valve piston.

20. The valve module according to claim 19, wherein:
a second opening of the plurality of openings is a pump connection, and the pump connection is arranged between the compression spring and the tank connection in a longitudinal direction of the valve piston; and
a third opening of the plurality of openings is a parking lock connection, and the parking lock connection is arranged between the compression spring and the tank connection in a longitudinal direction of the valve piston.

* * * * *